(12) United States Patent
Ishizaki et al.

(10) Patent No.: US 7,910,185 B2
(45) Date of Patent: Mar. 22, 2011

(54) OXYGEN ABSORBING RESIN, OXYGEN ABSORBING RESIN COMPOSITION AND OXYGEN ABSORBING CONTAINER

(75) Inventors: Yoichi Ishizaki, Yokohama (JP); Nobuo Hirakawa, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 923 days.

(21) Appl. No.: 11/584,788

(22) Filed: Oct. 20, 2006

(65) Prior Publication Data

US 2007/0036923 A1    Feb. 15, 2007

Related U.S. Application Data

(63) Continuation of application No. PCT/JP2005/008294, filed on May 2, 2005.

(30) Foreign Application Priority Data

Apr. 30, 2004    (JP) ................ 2004-136392

(51) Int. Cl.
*B32B 27/08*    (2006.01)
(52) U.S. Cl. ............... 428/36.6; 428/35.2; 428/35.4; 252/188.28
(58) Field of Classification Search ........... 428/35.2, 428/35.4, 36.6, 36.7; 252/188.28
See application file for complete search history.

(56) References Cited

U.S. PATENT DOCUMENTS 6,454,965 B1 * 9/2002 Ching et al. ............. 252/188.28
6,527,976 B1 * 3/2003 Cai et al. .................. 252/188.28

FOREIGN PATENT DOCUMENTS

| JP | 62-001824 | 1/1987 |
|---|---|---|
| JP | 07-224130 | 8/1995 |
| JP | 8-502306 | 3/1996 |
| JP | 2000-239370 | 9/2000 |
| JP | 2001-039475 | 2/2001 |
| JP | 3183704 | 4/2001 |
| JP | 2003-521552 | 7/2003 |
| JP | 2003-253131 | 9/2003 |

* cited by examiner

*Primary Examiner* — Michael C Miggins
(74) *Attorney, Agent, or Firm* — Hoffmann & Baron, LLP

(57) ABSTRACT

An oxygen absorbing resin comprising a carbon atom bonded to a carbon to carbon double bond group and further bonded to one hydrogen atom, the carbon atom contained in an alicyclic structure, which oxygen absorbing resin having been exposed to radiation. Further, there is provided an oxygen absorbing resin comprising a carbon atom bonded to both of the structure (a) carbon to carbon double bond group and (b) heteroatom-containing functional group or, as a bonding group derived from the functional group, carbon to carbon double bond group or aromatic ring, and further bonded to one or two hydrogen atoms, the carbon atom contained in an alicyclic structure.

23 Claims, No Drawings

OXYGEN ABSORBING RESIN, OXYGEN ABSORBING RESIN COMPOSITION AND OXYGEN ABSORBING CONTAINER

CROSS-REFERENCE TO RELATED APPLICATIONS

This application is a continuation of International Patent Application No. PCT/JP2005/008294, filed May 2, 2005, which claims the benefit of Japanese Patent Application No. 2004-136392, filed Apr. 30, 2004, the contents each of which are incorporated herein by reference in their entirety.

TECHNICAL FIELD

The present invention relates to an oxygen absorbing resin, an oxygen absorbing resin composition containing the same and an oxygen absorbing resin container prepared using the resin.

BACKGROUND ART

Presently, various plastic containers are used for packaging because of their advantages such as light weight, transparency and easiness of molding.

However, because an oxygen barrier property of the plastic containers is lower than these of metal containers and glass containers, the plastic containers have problems in that the contents of the containers deteriorate due to chemical oxidation and the action of aerobic bacteria.

For preventing these problems the plastic container walls have a multi-layer structure in which at least one layer is made of a resin having an excellent oxygen barrier property such as an ethylene-vinyl alcohol copolymer. In addition, there are other kinds of containers having an oxygen-absorbing layer for absorbing oxygen remaining in the containers and also oxygen gas penetrating into the containers from the outside. Oxygen gas absorbers (deoxidizer) used for forming the oxygen-absorbing layer include, for example, those mainly containing a reducing substance such as iron powder (see, for example, Japanese Examined Patent Publication (JP KOKOKU) No. Sho 62-1824).

A method in which an oxygen absorber such as iron powder is incorporated into a resin and the resulting resin composition is used as a material for forming the wall of a container used as a packaging material shows a sufficiently high ability to absorb oxygen gas, but the resulting resin composition has a color hue peculiar to the iron powder. Therefore, said method is limited in its application and cannot be used in the field of packaging in which transparency is required. Further, there have been disclosed, as a resin-based oxygen absorbing material, an oxygen absorbing resin composition comprising a carbon to carbon unsaturated bond-containing resin and a transition metal catalyst (see, for example, Japanese Un-Examined Patent Publication (JP KOKAI) No. 2001-39475, Japanese Un-Examined Patent Publication (JP KOHYO) No. Hei 8-502306 and Japanese Patent No. 3,183,704) and an oxygen absorbing resin composition comprising a resin having a cyclic olefin (cyclohexene) structure and a transition metal catalyst (in particular, a Co salt) (see, for example, Japanese Un-Examined Patent Publication (JP KOHYO) No. 2003-521552 and Japanese Un-Examined Patent Publication (JP KOKAI) No. 2003-253131). However, the former composition has a problem that the molecular chain of the resin is cleaved as the resin absorbs oxygen gas and thus generates low molecular weight organic components as an odor component. On the other hand, the latter composition comprises ring structures as the oxygen gas-absorbing sites, and accordingly it could somewhat inhibit the generation of such low molecular weight odor components, but there is a tendency that the use of such a transition metal catalyst (a Co salt) may easily result in the occurrence of reactions at sites other than the expected oxygen-absorbing sites and this in turn leads to the formation of decomposition products.

DISCLOSURE OF THE INVENTION

Problems that the Invention is to Solve

Accordingly, it is an object of the present invention to provide an oxygen absorbing resin which shows an excellent ability to absorb oxygen gas even in the absence of any transition metal catalyst.

Means for the Solution of the Problems

According to an aspect of the present invention, there is provided an oxygen absorbing resin comprising a carbon atom bonded to a carbon to carbon double bond group and further bonded to one hydrogen atom, the carbon atom being contained in an alicyclic structure, and the oxygen absorbing resin having been exposed to radiation.

According to another aspect of the present invention, there is provided an oxygen absorbing resin comprising a carbon atom bonded to both of the following structures (a) and (b) and further bonded to one or two hydrogen atoms, the carbon atom being contained in an alicyclic structure:
(a) a carbon to carbon double bond group; and
(b) either a heteroatom-containing functional group or a bonding group derived from the functional group, a carbon to carbon double bond group, or an aromatic ring.

According to a further aspect of the present invention, there is also provided an oxygen absorbing resin composition comprising the foregoing oxygen absorbing resin.

According to a still further aspect of the present invention, there is likewise provided an oxygen absorbing container comprising an oxygen absorbing layer consisting of the foregoing oxygen absorbing resin or oxygen absorbing resin composition.

EFFECTS OF THE INVENTION

The oxygen absorbing resin and oxygen absorbing resin composition of the present invention show an excellent ability to absorb oxygen gas even in the absence of any transition metal catalyst, and therefore they could enable the realization of oxygen absorbing materials showing practically acceptable oxygen absorbing ability while effectively inhibiting the generation of any low molecular weight odor component.

Best Mode for Carrying Out the Invention

According to the first aspect of the present invention, there is provided an oxygen absorbing resin comprising a carbon atom bonded to a carbon to carbon double bond group and further bonded to one hydrogen atom, the carbon atom being contained in an alicyclic structure, and the oxygen absorbing resin having been exposed to radiation.

The alicyclic structure of the oxygen absorbing resin according to this aspect may be a heterocyclic structure containing a heteroatom in the ring. Alternatively, the alicyclic structure may be either a monocyclic or polycyclic one and if it is a polycyclic ring structure, the rings other than those containing the foregoing carbon atom may be aromatic rings.

The alicyclic structure is preferably a 3-membered to 12-membered monocyclic or polycyclic ring, more preferably a 5- or 6-membered monocyclic structure and further preferably a 6-membered monocyclic structure. The 3- and 4-membered ring structures have high strain energy, and accordingly they are liable to easily cause the opening of rings to thus form a linear chain structure. Regarding ring structures comprising not less than 7 members, the synthesis thereof becomes more and more difficult as the size of the ring increases, and therefore it would be unfavorable as a material used on an industrial scale. Among these alicyclic structures, the 6-membered ring structures are, in particular, quite stable from the viewpoint of energy and can easily be synthesized, and accordingly they are preferably used in the present invention as the resin structure according to this aspect of the invention. Moreover, the foregoing alicyclic structure contains carbon atoms each bonded to a carbon to carbon double bond group and one hydrogen atom and preferably the carbon to carbon double bond group is contaned in the alicyclic structure.

The carbon atom bonded to a carbon to carbon double bond group and one hydrogen atom is highly reactive with oxygen and the resin having such a specific structure according to this aspect of the invention shows practically acceptable oxygen-absorbing ability even in the absence of any transition metal catalyst such as a Co salt if the resin has been exposed to radiation. Moreover, the oxygen-absorbing site is present in the alicyclic structure, and therefore low molecular weight decomposition components are scarcely generated even when the molecular chain of the resin is cleaved as the oxidation of the resin proceeds.

The radiation which is applied to the oxygen absorbing resin according to this aspect of the invention may be, for instance, particle beams such as electron beams, proton beams and neutron beams, and electromagnetic waves such as γ-rays, X-rays, visible light and ultraviolet light. Among them, particularly preferred as low energy radiation are light such as visible light and ultraviolet light, and more preferably used herein is ultraviolet light. Conditions herein for the irradiation of the resin with ultraviolet light are preferably, for instance, as follows: UV-A, and an integral quantity of light ranging from 100 to 10000 mJ/cm$^2$. As will be seen from the description of Example 13 given later, the oxygen absorbing resin, which shows the ability to absorb oxygen through the irradiation of the resin with ultraviolet rays according to this aspect of the invention, scarcely shows an ability to absorb oxygen gas prior to the irradiation of the resin with ultraviolet rays, and accordingly the resin has advantages in that it can easily be stored and it may be handled without any trouble. The best time for the irradiation of the resin with ultraviolet rays is not specifically restricted and may be after the polymerization of the oxygen absorbing resin, after the preparation of the oxygen absorbing resin composition, after the molding of the resin or the resin composition into a container or after the packaging of contents into the container and the subsequent airtight sealing of the container, but when the resin according to this aspect of the invention is used as a material for forming an oxygen absorbing container, the irradiation of the resin with ultraviolet rays is preferably carried out after the molding of the resin or the composition into a container and the charging of the contents into the same, and immediately before the airtight sealing of the container, to make effective use of the oxygen absorbing properties thereof.

The second aspect of the present invention relates to an oxygen absorbing resin comprising a carbon atom bonded to both of the following structures (a) and (b) and further bonded to one or two hydrogen atoms, the carbon atom being contained in an alicyclic structure:

(a) a carbon to carbon double bond group; and
(b) either a heteroatom-containing functional group or a bonding group derived from the functional group, a carbon to carbon double bond group, or an aromatic ring.

The alicyclic structure of the oxygen absorbing resin according to this aspect of the invention may be a heterocyclic structure containing a heteroatom in the ring. Alternatively, the alicyclic structure may be either a monocyclic or polycyclic one and if it is a polycyclic ring structure, the rings other than those containing the foregoing carbon atom may be aromatic rings. The alicyclic structure is preferably a 3-membered to 12-membered monocyclic or polycyclic ring, more preferably a 5- or 6-membered monocyclic structure and further preferably a 6-membered monocyclic structure, which is quite stable from the viewpoint of its energy state, like in the first aspect of the present invention. Further, the foregoing alicyclic structure contains a carbon atom bonded to both of the structures (a) and (b) and one or two hydrogen atoms and the resin preferably contains a carbon to carbon double bond group in the alicyclic structure.

Examples of the hetero atom-containing functional groups or the bonding groups derived from the functional groups as the structure (b) for the oxygen absorbing resin according to this aspect are the hydroxyl groups, carboxyl groups, formyl groups, amido groups, carbonyl groups, amino groups, ether bonds, ester bonds, amido bonds, urethane bonds and urea bonds. Preferably used herein are, for instance, functional groups each comprising an oxygen atom as the hetero atom or bonding groups derived from the oxygen atom-containing functional groups, and specific examples thereof are the hydroxyl groups, carboxyl groups, formyl groups, amido groups, carbonyl groups, ether bonds, ester bonds, amido bonds, urethane bonds and urea bonds. More preferably used herein are, for instance, carboxyl groups, carbonyl groups, amido groups, ester bonds and amido bonds. The resins having these functional groups and bonding groups according to this aspect can be prepared through relatively simple synthetic reactions, and therefore they are quite advantageous when they are used on an industrial scale.

In addition, the carbon atom bonded to both of the structures (a) and (b) and included in the alicyclic structure is preferably bonded to one hydrogen atom. If one of the two hydrogen atoms linked to a carbon atom has, for instance, an alkyl group substituted therefor to thus form a carbon atom bonded to only one hydrogen atom, the resulting resin would be further improved in its ability to absorb oxygen gas.

The resin having a specific structure according to this aspect possesses quite high reactivity with oxygen gas, and accordingly the resin can show actually acceptable oxygen-absorbing ability in the absence of any transition metal catalyst without having been exposed to any radiation. The reactivity of the resin according to this aspect is activated when the resin is subjected to a thermal history during the synthesis thereof and the molding process. It is thus possible to positively apply heat to the resin to improve the reactivity thereof or conversely to control the thermal history to thus suppress the reaction. For instance, when the reactivity is suppressed, the resin may be exposed to radiation to improve the reactivity thereof.

The radiation which is applied to the oxygen absorbing resin according to this aspect of the invention may be, for instance, particle beams such as electron beams, proton beams and neutron beams, and electromagnetic waves such as γ-rays, X-rays, visible light rays and ultraviolet light rays, like in the first aspect of the present invention. Among them, particularly preferred as low energy radiation are light rays such as visible light rays and ultraviolet light rays, and more preferably used herein are ultraviolet light rays. Conditions herein for the irradiation of the resin with ultraviolet rays are preferably, for instance, as follows: UV-A, and an integral quantity of light ranging from 100 to 10000 mJ/cm$^2$. The best time for the irradiation of the resin with ultraviolet rays is not specifically restricted, but when using the resin according to this aspect as a material for forming an oxygen absorbing container, the irradiation of the resin with ultraviolet rays is preferably carried out after the molding of the resin into a container and the charging of contents into the same and immediately before the airtight sealing of the container, to make effective use of the oxygen absorbing properties thereof.

The following descriptions are applicable to both of the foregoing first and second aspects of the present invention.

The oxygen absorbing resin of the present invention is preferably free of any allyl hydrogen atoms other than those present on the alicyclic structure. The allyl hydrogen atoms are relatively easily eliminated and thus quite susceptible to oxygen attack. When the resin has allyl hydrogen atoms on the linear chain structures other than the alicyclic structure, low molecular weight decomposition products are easily formed through the molecular cleavage as the oxidation of the allyl-positions with oxygen proceeds.

The resin of the present invention may comprise alicyclic structures other than those having high reactivity as has been described above in connection with the first and second aspects of the present invention or it may comprise, in other alicyclic structures, relatively low reactive allyl hydrogen atoms which are not included in the structures as shown in the first and second aspects of the present invention. In the case of these resins having the foregoing structures, the allyl hydrogen atoms present in the alicyclic structures having relatively low reactivity are activated due to the chain transfer of the radicals generated in the alicyclic structures having high reactivity as has been described above in connection with the first and second aspects of the present invention, and accordingly this is preferred since the oxygen-absorbing ability of the resin is often improved.

Examples of the oxygen absorbing resin of the present invention are those comprising repeating structures in which the foregoing alicyclic structures are connected to one another through any connecting group and pendant type structures in which the foregoing alicyclic structures are linked to a polymer main chain through any connecting group. The resin of the present invention preferably has a structure in which the connecting group derived from the hetero atom-containing functional group described above in connection with the structure (b) in the second aspect of the present invention also serves as the foregoing arbitrary connecting group since this makes the resin structure more simple and results in a relative increase in the content of the oxygen-absorbing sites present in the resin.

Examples of such resins each comprising a repeating unit, in which the foregoing alicyclic structures are connected to one another through any connecting group, are —(O-A-O—R)$_n$—, —(O—CO-A-CO—O—R)$_n$—, —(CO—O-A-O—CO—R)$_n$—, —(CO-A-CO—R)$_n$—, —(NH—CO—O-A-O—CO—NH—R)$_n$— and —(NH—CO-A-CO—NH—R)$_n$—. In these formulas, A represents the foregoing alicyclic structures, and R represents a saturated or unsaturated hydrocarbon group having 1 to 12 carbon atoms.

On the other hand, examples of the pendant type structures in which the foregoing alicyclic structures are linked to a polymer main chain through any connecting group include resins in which the foregoing alicyclic structures are linked to polymer chains such as ethylenic, ester type, amide type and ether type polymers through connecting groups derived from the hetero atom-containing functional groups such as ester bonds, amide bonds, ether bonds and urethane bonds.

The rate of the alicyclic structures present in the oxygen absorbing resin of the present invention preferably ranges from 0.1 to 30 meq/g and more preferably 0.2 to 15 meq/g. If the rate of these alicyclic structures falls within the range specified above, the resulting oxygen absorbing resin possesses an actually acceptable ability to absorb oxygen and the resin causes hardly any change of the color hue and hardly any reduction of the strength even after the absorption of oxygen gas.

The oxygen absorbing resin of the present invention preferably has a number average molecular weight ranging from 1,000 to 1,000,000 and more preferably 2,000 to 200,000. If the resin has a number average molecular weight falling within the range specified above, the resin would permit the formation of a film excellent in processability and durability.

The glass transition point of the oxygen absorbing resin according to the present invention is preferably not higher than 40° C., more preferably not higher than 30° C. and further preferably not higher than 20° C. If the glass transition point thereof falls within the range specified above, the resin has high mobility in an atmosphere maintained at room temperature and thus possesses an excellent ability to absorb oxygen gas. In this connection, the term "glass transition point (temperature)" used herein means one (Tg) determined in a nitrogen gas stream using a differential scanning calorimeter at a rate of temperature rise of 10° C./min.

The oxygen absorbing resins of the present invention may be used alone or in any combination of at least two of them.

The oxygen absorbing resins of the present invention can be prepared by, for instance, polycondensation of a derivative of tetrahydro-phthalic acid or tetrahydro-phthalic anhydride as a starting material. The polycondensation may be carried out according to any method known to one of ordinary skill in the art. For instance, the polycondensation may be carried out by the interfacial polycondensation technique, the solution polycondensation technique, the molten polycondensation technique or the solid phase polycondensation technique.

The oxygen absorbing resin of the present invention is preferably a polycondensed polymer prepared from a derivative of tetrahydro-phthalic acid or tetrahydro-phthalic anhydride as a starting material, the derivative as the starting material is more preferably a derivative of $\Delta^3$-tetrahydro-phthalic acid or $\Delta^3$-tetrahydro-phthalic anhydride and the derivative is further preferably a 4-methyl-$\Delta^3$-tetrahydro-phthalic acid or a 4-methyl-$\Delta^3$-tetrahydro-phthalic anhydride. The derivative of tetrahydro-phthalic anhydride can quite easily be synthesized by the Diels-Alder reaction of, for instance, maleic anhydride with a diene such as butadiene, isoprene or piperylene. For instance, products have each been manufactured by subjecting, a mixture of cis-3-methyl-$\Delta^4$-tetrahydro-phthalic anhydride and 4-methyl-$\Delta^4$-tetrahydro-phthalic anhydride, which can be prepared by reacting C$_5$-cut of the naphtha mainly comprising trans-piperylene and isoprene with maleic anhydride, to the stereo-isomerization reaction or the structural isomerization reaction. These products are commercially available at a low price, and accordingly they are particularly preferred starting materials when taking into consideration the fact that these starting materials are used on an industrial scale. Cis-3-methyl-$\Delta^4$-tetrahydro-phthalic anhydride and trans-3-methyl-$\Delta^4$-tetrahydro-phthalic anhydride as a stereoisomer thereof are preferred as starting materials for the oxygen absorbing resin according to the first aspect of the present invention. 4-Methyl-$\Delta^3$-tetrahydro-phthalic acid obtained by the structural-isomerization of 4-methyl-$\Delta^4$-tetrahydro-phthalic anhydride is preferred as the starting material for the oxygen absorbing resin according to the first and second aspects of the present invention. In addition to the foregoing, examples of the starting materials for the oxygen absorbing resin according to the first aspect of the present invention include 3,6-endomethylene-1,2,3,6-tetrahydro-phthalic anhydride and examples of the starting materials for the oxygen absorbing resin according to the first and second aspects of the present invention include exo-3,6-epoxy-1,2,3,6-tetrahydro-phthalic anhydride.

In the present invention, examples of the foregoing polycondensed polymers include polyethers, polyesters, polyamides and polycarbonates. When using, as starting monomers, tetrahydro-phthalic acid derivatives or tetrahydro-phthalic anhydride derivatives which can advantageously be used on an industrial scale, however, the polycondensed polymers derived therefrom are polyesters or polyamides. Among them, particularly preferred are polyesters.

The foregoing polyesters of the present invention can be prepared by the reaction of tetrahydro-phthalic acid derivatives or tetrahydro-phthalic anhydride derivatives with diol components. Examples of such diol components are ethylene glycol, diethylene glycol, triethylene glycol, polyethylene glycol, propylene glycol, di-propylene glycol, polypropylene glycol, 1,3-butanediol, 1,4-butanediol, 3-methyl-1,5-pentanediol, 1,6-hexnediol, 1,7-heptanediol, 1,8-octanediol, 1,9-nonanediol, neopentyl glycol, and 1,4-cyclohexane di-methanol.

Among these, preferably used herein are 1,4-butanediol and diethylene glycol from the viewpoint of their ability to absorb oxygen and from the economical standpoint. In particular, the polyester prepared starting from 1,4-butanediol is preferred since it only slightly undergoes a change in its hue after the absorption of oxygen.

Only one of the diol components listed above or any combination of at least two of them may be used in the present invention. In addition, it is also possible to add a small amount of a polyhydric alcohol having at least three hydroxyl groups such as glycerin, trimethylolpropane or pentaerythritol, as a monomer component.

Moreover, a di-carboxylic acid component may be added as a monomer component. Examples of such di-carboxylic acid components are aliphatic dicarboxylic acids such as succinic acid, oxalic acid, malonic acid, glutaric acid, adipic acid, pimelic acid, suberic acid, azelaic acid, sebacic acid, undecane diacid, dodecane diacid, and 3,3-dimethyl-pentane diacid and acid anhydrides thereof; alicyclic dicarboxylic acids such as cyclohexane dicarboxylic acid; and aromatic dicarboxylic acids such as phthalic anhydride, iso-phthalic acid, terephthalic acid, and 2,6-naphthalene dicarboxylic acid. It is also possible to add a small quantity of a polyvalent carboxylic acid possessing at least three carboxyl groups or an anhydride thereof such as trimellitic acid and 3,4-butane tetra-carboxylic acid. These acid components may be esterified into, for instance, methyl esters.

Further, it is also possible to add, as monomer components, hydroxy-carboxylic acids such as glycolic acid, lactic acid, hydroxy-pivalic acid, hydroxy-caproic acid and hydroxy-hexanoic acid and esters of these hydroxy-carboxylic acids; cyclic esters such as glycolide and lactide; or lactones such as ε-caprolactone.

A polymerization catalyst is not necessarily used in the present invention, but catalysts usable herein include, for instance, currently used polyester polymerization catalysts such as titanium-containing, germanium-containing, antimony-containing, tin-containing and aluminum-containing polymerization catalysts. In addition, it is also possible to use any known polymerization catalysts such as nitrogen atom-containing basic compounds, boric acid and boric acid esters, and organic sulfonic acid type compounds.

Moreover, various kinds of additives, for instance, coloration-inhibitory agents and/or antioxidants such as phosphate-containing compounds, can be used, when polymerizing the foregoing monomers. The addition of an antioxidant would permit the control of any absorption of oxygen during the polymerization of the monomers and the subsequent molding steps and this in turn permits the inhibition of any quality-deterioration of the resulting oxygen absorbing resin.

The polyester resins described above can be used not only as starting resins for the melt processing such as the molding through extrusion and the injection molding, but also as a paint after they are dissolved in a proper solvent. When using these polyester resins as a paint, a curing agent such as an isocyanate type one may be incorporated into the resin to thus give a two-pack type adhesive for lamination.

Furthermore, the oxygen absorbing resin of the present invention may be a copolymer prepared by the transesterification reaction of the foregoing polyester with saturated polyester resin. In the foregoing polymerization, it is difficult to obtain a high molecular weight polyester and accordingly, the resulting resin does not often have actually acceptable sufficient strength. If the resin is converted into a copolymer by the foregoing method, however, the resulting resin has a high molecular weight and certainly has a practically acceptable high strength. Examples of the foregoing saturated polyester resin include polyethylene terephthalate (PET), polybutylene terephthalate (PBT), poly(trimethylene terephthalate) (PTT), polyethylene naphthalate (PEN), glycol-modified polyethylene terephthalate (PETG), polyethylene succinate (PES), polybutylene succinate (PBS), poly(lactic acid), poly(glycolic acid), poly(caprolactone), and poly(hydroxy alkanoate). The rate of the alicyclic structure present in the oxygen absorbing resin after the copolymerization preferably ranges from 0.1 to 30 meq/g, and more preferably 0.2 to 15 meq/g. If the rate thereof falls within the range specified above, the resulting oxygen absorbing resin has a practically acceptable ability to absorb oxygen and it does not show any significant change in hue nor any significant reduction of strength even after the absorption of oxygen. In addition, the number average molecular weight of the oxygen absorbing resin after the copolymerization preferably ranges from 5,000 to 1,000,000, and more preferably 10,000 to 200,000.

The copolymerization by the transesterification reaction is preferred since it can easily be carried out according to, for instance, the reactive extrusion method.

In addition to the foregoing method, the polyester may be copolymerized by the reaction with a resin having reactive functional groups on the termini and/or side chains, for instance, a polyether such as polyethylene glycol, a polyamide or an acid-modified polyolefin.

Further, another type of thermoplastic resin may be incorporated into the oxygen absorbing resin of the present invention to thus form an oxygen absorbing resin composition. The thermoplastic resin usable herein may be any type thereof. Specific examples of thermoplastic resins include low-density polyethylene, medium-density polyethylene, high-density polyethylene, linear low-density polyethylene, linear super low-density polyethylene, polypropylene, poly-1-butene, poly-4-methyl-1-pentene, or polyolefins such as random or block copolymers of α-olefins (such as ethylene, propylene, 1-butene and 4-methyl-1-pentene), acid-modified polyolefins such as maleic anhydride-grafted polyethylene and maleic anhydride-grafted polypropylene, ethylene-vinyl compound copolymers such as ethylene-vinyl acetate copolymer, ethylene-vinyl alcohol copolymer, ethylene-vinyl chloride copolymer, ethylene-(meth)acrylic acid copolymer and ionic crosslinked products thereof (ionomers) and ethylene-methyl methacrylate copolymer, styrenic resins such as polystyrene, acrylonitrile-styrene copolymer and α-methyl styrene-styrene copolymer, polyvinyl compounds such as poly(methyl acrylate) and poly(methyl methacrylate), polyamides such as nylon 6, nylon 66, nylon 610, nylon 12 and poly(m-xylylene adipamide) (MXD6), polyesters such as polyethylene terephthalate (PET), polybutylene terephthalate (PBT), poly(trimethylene terephthalate) (PTT), polyethylene naphthalate (PEN), glycol-modified polyethylene terephthalate (PETG), polyethylene succinate (PES), polybutylene succinate (PBS), poly(lactic acid), poly(glycolic acid), poly(caprolactone) and poly(hydroxy alkanoate), polycarbonate, polyethers such as polyethylene oxide, or mixtures thereof.

Only one of the foregoing thermoplastic resins or any combination of at least two of them may be used.

The rate of the alicyclic structure present in the oxygen absorbing resin preferably ranges from 0.1 to 30 meq/g, and more preferably 0.2 to 15 meq/g. If the rate falls within the range specified above, the resulting oxygen absorbing resin has a practically acceptable ability to absorb oxygen and it does not show any significant change in hue nor any significant reduction of strength even after the absorption of oxygen.

The oxygen absorbing resin and the oxygen absorbing resin composition of the present invention may further comprise a variety of additives such as a radical polymerization initiator and/or a photosensitizer.

Examples of such a radical polymerization initiator and photosensitizer include those currently known as photopolymerization initiators, for instance, benzoins and their alkyl ethers such as benzoin, benzoin methyl ether, benzoin ethyl ether and benzoin propyl ether; acetophenones such as acetophenone, 2,2-di-methoxy-2-phenyl acetophenone, 2,2-diethoxy-2-phenyl acetophenone, 1,1-dichloro-acetophenone, 1-hydroxy-cyclohexyl phenyl ketone, 2-hydroxy-cyclohexyl phenyl ketone and 2-methyl-1-[4-(methyl-thio)phenyl]-2-morpholino-propan-1-one; anthraquinones such as 2-methyl anthraquinone and 2-amyl antlraquinone; thioxanthones such as 2,4-dimethyl-thioxanthone, 2,4-diethyl-thioxanthone, 2-chloro-thioxanthone and 2,4-di-isopropyl-thioxanthone; ketals such as acetophenone-dimethyl ketal and benzyl dimethyl ketal; benzophenones such as benzophenone; and xanthones. Such photo- and radical-polymerization initiators may be used in combination with one or at least two conventionally known and currently used photopolymerization initiators such as benzoic acid type or tertiary amine type initiators.

Examples of other additives are fillers, coloring agents, heat stabilizers, weatherable stabilizers, antioxidants, age resistors, light stabilizers, ultraviolet light absorbers, antistatic agents, lubricants such as metallic soaps and waxes, modifier resins or rubber and these additives may be incorporated into the resin or the resin composition according to any formulation known per se. For instance, the blending a lubricant into the resin or the resin composition would improve the ability of a screw to bite the resin. Examples of such lubricants generally used herein are metallic soaps such as magnesium stearate and calcium stearate; those mainly comprising hydrocarbons such as liquid paraffin, naturally occurring and synthetic paraffin, microwaxes, polyethylene waxes and chlorinated polyethylene waxes; aliphatic acid type ones such as stearic acid and lauric acid; aliphatic acid monoamide and bisamide type ones such as stearic acid amide, palmitic acid amide, oleic acid amide, esilic acid amide, methylene bis-stearamide and ethylene bis-stearamide; ester type ones such as butyl stearate, hardened castor oil and ethylene glycol monostearate; and mixtures thereof.

The oxygen absorbing resin and the oxygen absorbing resin composition of the present invention may be used for absorbing oxygen gas present in a airtightly sealed package, in the form of, for instance, powder, granules or a sheet. Moreover, they may be incorporated into a resin or rubber for forming a liner, a gasket or a coating film in order to absorb the oxygen gas remaining in a package. In particular, the oxygen absorbing resin and the oxygen absorbing resin composition of the present invention are preferably used as an oxygen absorbing container made of a laminate which comprises at least one layer containing the resin or the resin composition and one or a plurality of layers of other resms.

The oxygen absorbing container of the present invention comprises at least one layer (hereunder referred to as an "oxygen absorbing layer") consisting of the foregoing oxygen absorbing resin and oxygen absorbing resin composition.

The materials for forming the layers other than the oxygen absorbing layer, which constitute the oxygen absorbing container of the present invention, may appropriately be selected from the group consisting of thermoplastic resins, thermosetting resins, and inorganic materials such as metals and paper while taking into consideration the modes of applications and required functions thereof. For instance, the thermoplastic resins listed above in connection with the thermoplastic resins capable of being incorporated into the oxygen absorbing resin of the present invention, metal foils and inorganic vapor deposition films, can be mentioned.

Regarding the oxygen absorbing container of the present invention, an oxygen-barrier layer is preferably arranged at least on the outer side of the oxygen absorbing layer for the further improvement of the effect of the oxygen absorbing resin or the oxygen absorbing resin composition. Such a construction of the container would allow the effective absorption of the external oxygen gas possibly penetrating into the container and the oxygen gas remaining in the container to thus control the oxygen concentration in the container to a considerably low level over a long period of time.

The oxygen-barrier layer may be prepared using a resin having oxygen-barrier characteristic properties (oxygen-barrier resin). Such an oxygen-barrier resin may be, for instance, ethylene-vinyl alcohol copolymers (EVOH). Also usable herein as an oxygen barrier resin may be, for instance, a saponified copolymer obtained by the saponification of an ethylene-vinyl acetate copolymer having an ethylene content ranging from 20 to 60 mole % and preferably 25 to 50 mole % to a degree of saponification of not less than 96 mole % and preferably not less than 99 mole %. Other examples of such oxygen-barrier resins are poly(m-xylylene adipamide) (MXD6) and poly(glycolic acid).

In a case where the oxygen absorbing container of the present invention is, in particular, a film container such as a pouch, usable as such an oxygen-barrier layer may be, for instance, a foil of a light metal such as aluminum; a metal foil such as an iron foil, a tin plate foil, a surface-treated steel foil; a metal thin film or a metal oxide thin film formed on a substrate such as a biaxially oriented PET film by the evaporation method; or a diamond-like carbon thin film. It is also possible to use a barrier-coating film obtained by applying an oxygen-barrier coating layer onto a substrate film such as a biaxially oriented PET film.

Examples of materials constituting such metal thin films include iron, aluminum, zinc, titanium, magnesium, tin, copper and silicon, with aluminum being particularly preferred.

Examples of materials constituting such metal oxide thin films include silica, alumina, zirconium oxide, titanium oxide and magnesium oxide, with silica and alumina being particularly preferred. In this connection, only one of these materials or any combination of at least two of them may be used or further a film of each material may be laminated with another material identical to or different from the former material.

The vapor deposition of such a thin film may be carried out according to any known method, for instance, a physical vapor deposition technique (PVD technique) such as the vacuum deposition technique, the sputtering technique, the ion plating technique or the laser ablazion technique; or a chemical vapor deposition technique (CVD technique) such as the plasma chemical vapor deposition technique, the thermal chemical vapor deposition technique or the optical chemical vapor deposition technique.

Examples of materials constituting the oxygen-barrier coating include resins having a high ability to form hydrogen bonds such as polyvinyl alcohol, ethylene-vinyl alcohol copolymers, poly(meth)acrylic acids, poly(allyl-amine), polyacrylamide and polysaccharides, vinylidene chloride resins, and epoxy-amines. In addition, it is also preferred to incorporate an inorganic compound having a lamellar structure such as montmorillonite into these materials.

Moreover, preferably used herein as the oxygen absorbing container of the present invention include containers having an oxygen absorbing barrier layer which comprises the foregoing oxygen-barrier resin containing the oxygen absorbing resin and the oxygen absorbing resin composition incorporated into the same. In this case, a separate oxygen-barrier layer and a separate oxygen absorbing layer are not necessarily used, and therefore this would permit the simplification of the layer structure of the oxygen absorbing container.

The oxygen absorbing container may be produced by any molding method known per se.

For instance, extrusion molding operations can be carried out using a number of extruders corresponding to the kinds of the resins used and a multilayered and multiple die to thus form a multi-layer film, a multi-layer sheet, a multi-layer parison or a multi-layer pipe. Alternatively, a multi-layer preform for molding bottles may be prepared according to a co-injection molding technique such as the simultaneous injection method or the sequential injection method using a number of extruders corresponding to the kinds of the resins used. Such a multi-layer film, parison or preform can be further processed to thus form an oxygen absorbing multilayered container.

The packaging material such as a film may be used as pouches having a variety of shapes, and a capping material for trays and cups. Examples of such pouches include three sided seal or four sided seal flat pouches, gusseted pouches, standing pouches and pillow-shaped packaging bags. These bags may be prepared by any known bag-manufacturing method. Moreover, a film or a sheet can be subjected to a molding means such as the vacuum forming technique, the pressure forming technique, the stretch forming technique and the plug-assist forming technique to thus obtain a packaging container having a cup-like or tray-like shape.

A multi-layer film or a multi-layer sheet may be prepared using, for instance, the extrusion coating technique or the sandwich-lamination technique. In addition, single-layer and multi-layer films, which have been formed in advance, can be laminated together by the dry-lamination technique. Such methods specifically include, for instance, a method in which a transparent vapor deposited film can be laminated with a co-extruded film having a three-layer structure—a thermoplastic resin layer/an oxygen absorbing layer/a thermoplastic resin (sealant) layer—through the dry-lamination technique; a method in which two layers—an oxygen absorbing layer/a sealant layer—can be extrusion-coated, through an anchoring agent, with a two-layer film comprising biaxially oriented PET film/aluminum foil laminated together by the dry-lamination technique; or a method in which a polyethylene single-layer film is sandwich-laminated, through a polyethylene-based oxygen absorbing resin composition, with a two-layer film comprising barrier coating film/polyethylene film which are laminated by the dry-lamination technique, but the present invention is not restricted to these specific methods at all.

Furthermore, a bottle or a tube may easily be formed by pinching off a parison, a pipe or a preform by using a pair of split molds and then blowing a fluid through the interior thereof. Moreover, a pipe or a preform is cooled, then heated to an orientation temperature and oriented in the axial direction while blow-orientating the same in the circumferential direction by the action of a fluid pressure to thus form a stretch blow-molded bottle.

The oxygen absorbing container of the present invention can effectively inhibit any penetration of external oxygen into the container through the wall thereof and can absorb the oxygen gas remaining in the container. For this reason, the container is quite useful since it permits the maintenance of the internal oxygen concentration at a quite low level over a long period of time, the prevention of any quality deterioration of the content thereof due to the action of oxygen present therein and the prolonging of the shelf life of the content.

The oxygen absorbing resin or composition of the present invention can thus be used for the packaging of contents quite susceptible to deterioration in the presence of oxygen, in particular, foods such as coffee beans, tea leaves (green tea), snacks, baked confectionery prepared from rice, Japanese unbaked and semi-baked cakes, fruits, nuts, vegetables, fish and meat products, pasted products, dried fish and meat, smoked fish and meat, foods boiled in soy sauce, uncooked and cooked rice products, infant foods, jam, mayonnaise, ketchup, edible fats and oils, dressings, sauces and dairy products; beverages such as beer, wine, fruit juices, green tea, and coffee; and other products such as pharmaceutical preparations, cosmetic products and electronic parts, but the present invention is not restricted to these specific ones at all.

EXAMPLES

The present invention will hereunder be described in more detail with reference to the following Examples. In the following Examples, each numerical value was determined according to the method specified below:

(1) Number Average Molecular Weight (Mn)

This was determined by the gel permeation chromatography (GPC) technique (HLC-8120 Model GPC available from Tosoh Corporation) and expressed in terms of the value relative to that of the polystyrene. In this case, chloroform was used as the solvent.

(2) Glass Transition Point (Tg)

This was determined in a nitrogen gas stream at a rate of temperature rise of 10° C./min using a differential scanning calorimeter (DSC-7 Model available from Perkin Elmer company).

(3) Amount of Oxygen Absorbed

A specimen cut out was introduced into an oxygen-impermeable steel foil-laminated cup having an inner volume of 85 cm³, then the cup was heat sealed with an aluminum foil-laminated film cap and stored within an atmosphere maintained at 22° C. After storage of the cup for a predetermined time period, the oxygen gas concentration within the cup was determined by a micro-gas chromatograph (M-200 available from Agirent Technology Co., Ltd.) to thus calculate the amount of oxygen absorbed per one gram of the resin.

Example 1

To a 300 ml volume separable flask equipped with a stirring machine, a nitrogen gas-introduction tube and a Dean-Stark type water separator, were added 99.7 g of methyl tetrahydro-phthalic anhydride (available from Tokyo Chemical Industry Co., Ltd.) containing about 53% by mass of 4-methyl-Δ 3-tetrahydro-phthalic anhydride, 59.5 g of 1,4-butanediol (available from Wako Pure Chemical Industries, Ltd.), 8.0 g of a 0.5% by mass aqueous solution of germanium oxide and 20 ml of toluene, the reaction of these components was continued at a temperature ranging from 160 to 180° C. in a nitrogen gas atmosphere over about 4.0 hours, while removing the water generated, and then the reaction was further continued for an additional 0.5 hour while raising the temperature of the reaction system up to 220° C. Subsequently, the toluene was removed from the reaction system, and finally the polymerization was carried out under a reduced pressure of 0.1 kPa at 220° C. for 4.0 hours and then at 240° C. for an additional 1.0 hour to thus obtain a highly viscous liquid polyester A. The Tg value of the polyester A was found to be −3° C.

The resulting polyester A (50 g) and polybutylene terephthalate copolymer (PBT, JURANEX 600LP available from Poly-Plastic Company, 50 g) were copolymerized, in a reaction container equipped with a stirring machine, through the transesterification reaction thereof under a reduced pressure of not more than 0.2 kPa at a temperature ranging from 200 to 240° C. for 2 hours while heating and stirring them to thus obtain a solid polyester copolymer. The number average molecular weight of this polyester copolymer was found to be 20,000.

The resulting polyester copolymer was formed into a film having an average thickness of about 70 μm using a hot press maintained at 180° C., and a specimen of 30 cm² was cut off from the film and used for the evaluation of the amount of absorbed oxygen. The results thus obtained are summarized in the following Table 1.

Example 2

The polyester copolymer film prepared in Example 1 was irradiated with light rays within the UV-A light region using a high pressure mercury lamp (UVL-7000H4-O available from Ushio Inc.) under the conditions such that the maximum illuminance was equal to 300 mW/cm² and the integral quantity of light reached 2300 mJ/cm². A specimen of 30 cm² was cut off from the film thus irradiated with light rays and used for the evaluation of the amount of absorbed oxygen. The results thus obtained are summarized in the following Table 1.

Example 3

To a 300 ml volume separable flask equipped with a stirring machine, a nitrogen gas-introduction tube and a Dean-Stark type water separator, were added 99.7 g of 3- or 4-methyl-Δ⁴-tetrahydro-phthalic anhydride (RIKASID MT-500TZ available from New Japan Chemical Co., Ltd.), 59.5 g of 1,4-butanediol (available from Wako Pure Chemical Industries, Ltd.), 8.0 g of a 0.5% by mass aqueous solution of germanium oxide and 20 ml of toluene, the reaction of these components was continued at a temperature ranging from 160 to 180° C. in a nitrogen gas atmosphere over about 4.0 hours, while removing the water generated and then the reaction was further continued for an additional 0.5 hour while raising the temperature of the reaction system up to 220° C. Subsequently, the toluene was removed from the reaction system, finally the polymerization was carried out under a reduced pressure of 0.1 kPa at 220° C. for 4.0 hours and then at 240° C. for an additional 1.0 hour to thus obtain a highly viscous liquid polyester B. The Tg value of the polyester B was found to be −5° C.

The resulting polyester B was copolymerized with PBT by the same method as that used in Example 1 to thus obtain a solid polyester copolymer. The number average molecular weight of this polyester copolymer was found to be 12,000.

The resulting polyester copolymer was formed into a film having an average thickness of about 70 μm using a hot press maintained at 180° C. and the resulting film was irradiated with light rays under the same conditions as those used in Example 2. Then a specimen of 30 cm² was cut off from the film thus irradiated with light rays and used for the evaluation of the amount of absorbed oxygen. The results thus obtained are summarized in the following Table 1.

Comparative Example 1

To a 300 ml volume separable flask equipped with a stirring machine, a nitrogen gas-introduction tube and a Dean-Stark type water separator, were added 99.7 g of Δ 4-tetrahydro-phthalic anhydride (RIKASID TH available from New Japan. Chemical Co., Ltd.), 59.5 g of 1,4-butanediol (available from Wako Pure Chemical Industries, Ltd.), 8.0 g of a 0.5% by mass aqueous solution of germanium oxide and 20 ml of toluene, the reaction of these components was continued at a temperature ranging from 160 to 180° C. in a nitrogen gas atmosphere over about 4.0 hours, while removing the water generated and then the reaction was further continued for an additional 0.5 hour while raising the temperature of the reaction system up to 220° C. Subsequently, the toluene was removed from the reaction system, finally the polymerization was carried out under a reduced pressure of 0.1 kPa at 220° C. for 4.0 hours and then at 240° C. for an additional 1.0 hour to thus obtain a highly viscous liquid polyester C.

The resulting polyester C was copolymerized with PBT by the same method as that used in Example 1 to thus obtain a solid polyester copolymer. The number average molecular weight of this polyester copolymer was found to be 11,000.

The resulting polyester copolymer was formed into a film having an average thickness of about 70 μm using a hot press maintained at 180° C., then a specimen of 30 cm² was cut off from the film and used for the evaluation of the amount of oxygen absorbed by the specimen. The results thus obtained are summarized in the following Table 1.

Comparative Example 2

The film of the polyester copolymer prepared in Comparative Example 1 was irradiated with light rays under the same conditions as those used in Example 2. Then a specimen of 30 cm² was cut off from the film thus irradiated with light rays and used for the evaluation of the amount of absorbed oxygen. The results thus obtained are summarized in the following Table 1.

Comparative Example 3

The same procedures as those used in Example 3 were repeated, except for omitting the irradiation with light rays, to thus evaluate the amount of absorbed oxygen. The results thus obtained are summarized in the following Table 1.

Example 4

The polyester A (50 g) and polybutylene succinate (PBS, GS-Pla Mitsubishi Chemical Co., Ltd., 50 g) were copolymerized, in a reaction container equipped with a stirring machine, through the transesterification reaction thereof under a reduced pressure of not more than 0.2 kPa at a temperature ranging from 200 to 220° C. for 1.5 hour while heating and stirring them to thus obtain a solid polyester copolymer. The number average molecular weight of this polyester copolymer was found to be 14,000.

The resulting polyester copolymer was formed into a film having an average thickness of about 50 μm using a hot press maintained at 180° C., and a specimen of 30 cm$^2$ was cut off from the film and used for the evaluation of the amount of absorbed oxygen. The results thus obtained are summarized in the following Table 1.

Example 5

The polyester copolymer film prepared in Example 4 was irradiated with light rays under the same conditions as those used in Example 2. Then a specimen of 30 cm$^2$ was cut off from the film thus irradiated with light rays and used for the evaluation of the amount of absorbed oxygen. The results thus obtained are summarized in the following Table 1.

Example 6

The polyester B was copolymerized with PBS by the same method as that used in Example 4 to thus obtain a solid polyester copolymer. The number average molecular weight of this polyester copolymer was found to be 10,000.

The resulting polyester copolymer was formed into a film having an average thickness of about 50 μm using a hot press maintained at 180° C. and the resulting film was irradiated with light rays under the same conditions as those used in Example 2. Then a specimen of 30 cm$^2$ was cut off from the film thus irradiated with light rays and used for the evaluation of the amount of absorbed oxygen. The results thus obtained are summarized in the following Table 1.

Comparative Example 4

The polyester C was copolymerized with PBS by the same method as that used in Example 4 to thus obtain a solid polyester copolymer. The number average molecular weight of this polyester copolymer was found to be 9,000.

The resulting polyester copolymer was formed into a film having an average thickness of about 50 μm using a hot press maintained at 180° C., then a specimen of 30 cm$^2$ was cut off from the film and used for the evaluation of the amount of oxygen absorbed by the specimen. The results thus obtained are summarized in the following Table 1.

Comparative Example 5

The film of the polyester copolymer prepared in Comparative Example 4 was irradiated with light rays under the same conditions as those used in Example 2. Then a specimen of 30 cm$^2$ was cut off from the film thus irradiated with light rays and used for the evaluation of the amount of absorbed oxygen. The results thus obtained are summarized in the following Table 1.

Comparative Example 6

The polyester B was copolymerized with PBS by the same method as those used in Example 4 to thus obtain a solid polyester copolymer. The number average molecular weight of this polyester copolymer was found to be 10,000.

The resulting polyester copolymer was formed into a film having an average thickness of about 50 μm using a hot press maintained at 180° C., then a specimen of 30 cm$^2$ was cut off from the film and used for the evaluation of the amount of oxygen absorbed by the specimen. The results thus obtained are summarized in the following Table 1.

Example 7

To a 300 ml volume separable flask equipped with a stirring machine, a nitrogen gas-introduction tube and a Dean-Stark type water separator, were added 99.7 g of methyl tetrahydrophthalic anhydride (available from Tokyo Chemical Industry Co., Ltd.) containing about 53% by mass of 4-methyl-$\Delta^3$-tetrahydro-phthalic anhydride, 59.5 g of 1,4-butanediol (available from Wako Pure Chemical Industries, Ltd.), 5.7 g of ethyl lactate (available from Wako Pure Chemical Industries, Ltd.), 8.0 g of a 0.5% by mass aqueous solution of germanium oxide and 20 ml of toluene, the reaction of these components was continued at a temperature of 145° C. for 3 hours and then at a temperature ranging from 180 to 220° C. for 1.5 hours in a nitrogen gas atmosphere, while removing the water generated.

Subsequently, the toluene was removed from the reaction system, and finally the polymerization was carried out under a reduced pressure of 0.1 kPa at 220° C. for 5.0 hours to thus obtain a highly viscous liquid polyester D. The Tg value of the polyester D was found to be −1° C.

The resulting polyester D (50 g) was copolymerized with PBS (50 g), in a reaction container equipped with a stirring machine, through the transesterification reaction thereof under a reduced pressure of not more than 0.2 kPa at a temperature ranging from 200° C. for 1.0 hour while heating and stirring them to thus obtain a solid polyester copolymer. The number average molecular weight of this polyester copolymer was found to be 13,000.

The resulting polyester copolymer was formed into a film having an average thickness of about 50 11 m using a hot press maintained at 180° C., and a specimen of 30 cm$^2$ was cut off from the film and used for the evaluation of the amount of absorbed oxygen. The results thus obtained are summarized in the following Table 1.

Example 8

To a 300 ml volume separable flask equipped with a stirring machine, a nitrogen gas-introduction tube and a Dean-Stark type water separator, were added 99.7 g of methyl tetrahydrophthalic anhydride (available from Tokyo Chemical Industry Co., Ltd.) containing about 53% by mass of 4-methyl-$\Delta^3$-tetrahydro-phthalic anhydride, 56.8 g of 1,4-butanediol (available from Wako Pure Chemical Industries, Ltd.) and 20 ml of toluene and the temperature of the reaction system was gradually raised from 160 to 225° C. in a nitrogen gas atmosphere to allow them to cause a dehydration reaction for about 4.5 hours. Subsequently, the toluene was removed from the reaction system, finally the polymerization was carried out under a reduced pressure of 0.3 kPa at 225° C. for 1.0 hour and then at 240° C. for an additional 4.0 hours to thus obtain a rubbery polyester E. The Tg value of the polyester E was found to be 3° C.

The resulting polyester E (40 parts by mass) and low-density polyethylene (LDPE, L-705 available from Sumitomo Chemical Co., Ltd., 60 parts by mass) were melt-blended, in a laboratory mixing extruder (CS-194AV available from Toyo Seiki Co., Ltd.) at a temperature of 180° C. to thus obtain a resin blend.

The resulting resin was formed into a film having an average thickness of about 70 μm using a hot press maintained at 180° C., and a specimen of 30 cm² was cut off from the film and used for the evaluation of the amount of absorbed oxygen. The results thus obtained are summarized in the following Table 1.

Example 9

The film formed from the blend of the oxygen absorbing polyester and LDPE, prepared in Example 8, was irradiated with light rays under the same conditions as those used in Example 2. A specimen of 30 cm² was cut off from the film thus irradiated with light rays and used for the evaluation of the amount of absorbed oxygen. The results thus obtained are summarized in the following Table 1.

Example 10

To a 300 ml volume separable flask equipped with a stirring machine, a nitrogen gas-introduction tube and a Dean-Stark type water separator, were added 99.7 g of methyl tetrahydro-phthalic anhydride (available from Tokyo Chemical Industry Co., Ltd.) containing about 53% by mass of 4-methyl-$\Delta^3$-tetrahydro-phthalic anhydride, 76.4 g of diethylene glycol (available from Kishida Chemical Co., Ltd.), and 20 ml of toluene, the reaction of these components being continued at a temperature ranging from 160 to 200° C. in a nitrogen gas atmosphere over about 4.5 hours, while removing the water generated. Subsequently, the toluene was removed from the reaction system, 0.14 g of titanium tetra-isopropoxide was added to the system, finally the polymerization was carried out under a reduced pressure of 0.1 kPa at 200° C. for 2.0 hours and then at 220° C. for an additional 1.0 hour to thus obtain a highly viscous liquid polyester F. The Tg value of the polyester F was found to be −1° C.

The resulting polyester F and PBS were copolymerized by repeating the same procedures as those used in Example 7 to thus obtain a solid polyester copolymer. The number average molecular weight of this polyester copolymer was found to be 29,000.

The resulting polyester copolymer was formed into a film having an average thickness of about 70 μm using a hot press maintained at 180° C. and then the resulting film was irradiated with light rays under the same conditions as those used in Example 1. A specimen of 30 cm² was cut off from the film thus irradiated with light rays and used for the evaluation of the amount of absorbed oxygen. The results thus obtained are summarized in the following Table 1.

Example 11

To a 300 ml volume separable flask equipped with a stirring machine, a nitrogen gas-introduction tube and a Dean-Stark type water separator, were added 99.7 g of methyl tetrahydro-phthalic anhydride (available from Tokyo Chemical Industry Co., Ltd.) containing about 53% by mass of 4-methyl-$\Delta^3$-tetrahydro-phthalic anhydride, 62.1 g of ethylene glycol (available from Kishida Chemical Co., Ltd.), and 20 ml of toluene, the reaction of these components being continued at a temperature ranging from 160 to 200° C. in a nitrogen gas atmosphere over about 5.0 hours, while removing the water generated. Subsequently, the toluene was removed from the reaction system, 0.14 g of titanium tetra-isopropoxide was added to the system, finally the polymerization was carried out under a reduced pressure of 0.1 kPa at 200° C. for 2.0 hours and then at 220° C. for an additional 1.0 hour to thus obtain a solid polyester G. The Tg value of the polyester G was found to be 32° C.

The resulting polyester G and PBS were copolymerized by repeating the same procedures as those used in Example 7 to thus obtain a polyester copolymer. The number average molecular weight of this polyester copolymer was found to be 23,000.

The resulting polyester copolymer was formed into a film having an average thickness of about 70 μm using a hot press maintained at 180° C. and then the resulting film was irradiated with light rays under the same conditions as those used in Example 1. A specimen of 30 cm² was cut off from the film thus irradiated with light rays and used for the evaluation of the amount of absorbed oxygen. The results thus obtained are summarized in the following Table 1.

Example 12

A 12 μm thick transparent, vapor deposited, biaxially oriented PET film (GL-AEH available from Toppan Printing Co., Ltd.) was adhered to a 30 μm thick LDPE film (V-1 available from Tama Poly Company) using a two-pack type urethane adhesive (TAKELACK A-315+TAKENATE A-50 available from Takeda Chemical Industries, Ltd.) in such a manner that the vapor-deposited surface of the vapor-deposited film faced the corona-discharged surface of the LDPE film and then the adhesive was cured at 50° C. for 3 days to thus prepare a two-layer film of transparent vapor-deposited PET/LDPE. The oxygen absorbing film having an average thickness of 70 μm prepared in Example 8 was thermally laminated with the two-layer film on the LDPE side to thus form an oxygen absorbing laminate film.

The resulting laminate films were put on top of each other so that the oxygen absorbing film sides were opposed to one another and the 4 sides thereof were sealed so that the amount of air in the resulting pouch was equal to 15 ml to thus form a transparent flat pouch having an inner size of 55 mm×75 mm.

This flat pouch was stored under the conditions of a relative humidity of 60% RH and a temperature of 22° C. and the oxygen concentration within the pouch was monitored using a micro-gas chromatograph. The results thus obtained are listed in the following Table 2.

Example 13

The oxygen absorbing polyester copolymer film having a thickness of about 70 μm and prepared in Example 3 was subjected to a corona discharge treatment, the oxygen absorbing film was adhered to a 12 μm thick transparent, vapor deposited, biaxially oriented PET film (GL-AEH available from Toppan Printing Co., Ltd.) using a two-pack type urethane adhesive (TAKELACK A-315+TAKENATE A-50 available from Takeda Chemical Industries, Ltd.) in such a manner that the vapor-deposited surface of the vapor-deposited film faced the corona-discharged surface of the oxygen absorbing film and then the adhesive was cured at 50° C. for 2 days in the atmosphere to thus prepare a two-layer film of transparent vapor-deposited PET/oxygen absorbing polyester copolymer. Almost no oxygen absorption by the two-layer film was observed during the curing operation.

The oxygen absorbing film side of the resulting two-layer film was irradiated with light rays under the same conditions as those used in Example 2.

The resulting two-layer films immediately after the irradiation with light rays were put on top of each other so that the oxygen absorbing film sides faced each other and the 4 sides thereof were sealed so that the amount of air in the resulting pouch was equal to 5 ml to thus form a transparent flat pouch having an inner size of 55 mm×75 mm.

This flat pouch was stored under the conditions of a relative humidity of 60% RH and a temperature of 22° C. and the oxygen concentration within the pouch was monitored using a micro-gas chromatograph. The results thus obtained are listed in the following Table 2.

TABLE 1

| Ex. No. | Amt. of Absorbed Oxygen (ml/g) | | | | Eval. |
|---|---|---|---|---|---|
| | Initial | Aft. 1 Day | Aft. 3 Days | Aft. 7 Days | |
| 1 | 0 | 1.5 | 5.9 | 13.2 | ○ |
| 2 | 0 | 2.2 | 6.9 | 13.9 | ○ |
| 3 | 0 | 1.0 | 3.8 | 7.1 | ○ |
| 1* | 0 | 0 | 0 | 1.2 | X |
| 2* | 0 | 0.4 | 1.1 | 4.0 | Δ |
| 3* | 0 | 0 | 0.5 | 2.2 | Δ |
| 4 | 0 | 0.3 | 1.5 | 8.0 | ○ |
| 5 | 0 | 3.8 | 9.5 | 19.1 | ○ |
| 6 | 0 | 2.2 | 4.8 | 8.5 | ○ |
| 4* | 0 | 0 | 0 | 0 | X |
| 5* | 0 | 0 | 1 | 2.7 | Δ |
| 6* | 0 | 0 | 0 | 0 | X |
| 7 | 0 | 0.6 | 5.0 | 15.0 | ○ |
| 8 | 0 | 0.6 | 3.3 | 10.3 | ○ |
| 9 | 0 | 3.5 | 8.4 | 14.6 | ○ |
| 10 | 0 | 2.0 | 6.3 | 15.0 | ○ |
| 11 | 0 | 1.9 | 3.8 | 8.3 | ○ |

*Comparative Example

TABLE 2

| | | Storage Time (day) | | | | |
|---|---|---|---|---|---|---|
| | | 0 | 1 | 3 | 7 | 14 |
| Ex. 12 | Oxygen Concn. in Container (%) | 20.9 | 16.4 | 2.4 | <0.1 | <0.1 |
| Ex. 13 | Oxygen Concn. in Container (%) | 20.9 | 13.2 | 1.2 | <0.1 | <0.1 |

What is claimed is:

1. An oxygen absorbing resin comprising a carbon atom bonded to both of the following structures (a) and (b) and further bonded to one or two hydrogen atoms, the carbon atom being contained in an alicyclic structure:
   (a) a carbon to carbon double bond group; and
   (b) either a heteroatom-containing functional group or a bonding group derived from the functional group, a carbon to carbon double bond group, or an aromatic ring,
wherein the resin is a polycondensedpolymer prepared from a derivative of tetrahydro-phthalic acid or tetrahydro-phthalic anhydride as a starting material and the derivative of tetrahydro-phthalic acid or tetrahydro-phthalic anhydride comprises a derivative of $\Delta^3$-tetrahydro-phthalic acid or $\Delta^3$-tetrahydro-phthalic anhydride.

2. The oxygen absorbing resin of claim 1, wherein the structure (b) is a member selected from the group consisting of ester bonds and amido bonds.

3. The oxygen absorbing resin of claim 1, wherein the resin is completely free of any allyl hydrogen atom other than those contained in the alicyclic structure.

4. An oxygen absorbing resin composition comprising the oxygen absorbing resin of claim 1.

5. The oxygen absorbing resin of claim 1, wherein the oxygen absorbing resin is completely free of any transition metal salt as an oxidation catalyst.

6. The oxygen absorbing resin of claim 1, wherein the resin has been exposed to radiation.

7. The oxygen absorbing resin of claim 6, wherein the radiation is light.

8. The oxygen absorbing resin of claim 7, wherein the light is ultraviolet light.

9. The oxygen absorbing resin of claim 1, wherein the derivative of $\Delta^3$-tetra-hydro-phthalic acid or $\Delta^3$-tetrahydro-phthalic anhydride comprises 4-methyl-$\Delta^3$-tetrahydro-phthalic acid or 4-methyl-$\Delta^3$-tetrahydro-phthalic anhydride.

10. The oxygen absorbing resin of claim 9, wherein the polycondensed polymer is a polyester.

11. An oxygen absorbing resin composition comprising the oxygen absorbing resin of claim 10.

12. The oxygen absorbing resin of claim 10, wherein the oxygen absorbing resin is completely free of any transition metal salt as an oxidation catalyst.

13. An oxygen absorbing container comprising an oxygen absorbing layer comprising the oxygen absorbing resin of claim 10.

14. The oxygen absorbing container of claim 13, wherein the container comprises an oxygen-barrier layer on the outside of the oxygen absorbing layer.

15. The oxygen absorbing resin of claim 10, wherein the polyester is copolymerized with a saturated polyester resin through a transesterification reaction.

16. The oxygen absorbing resin of claim 1, wherein the polycondensed polymer is a polyester.

17. The oxygen absorbing resin of claim 16, wherein the polyester is copolymerized with a saturated polyester resin through a transesterification reaction.

18. An oxygen absorbing resin composition comprising the oxygen absorbing resin of claim 16.

19. The oxygen absorbing resin of claim 16, wherein the oxygen absorbing resin is completely free of any transition metal salt as an oxidation catalyst.

20. An oxygen absorbing container comprising an oxygen absorbing layer comprising the oxygen absorbing resin of claim 16.

21. The oxygen absorbing container of claim 20, wherein the container comprises an oxygen-barrier layer on the outside of the oxygen absorbing layer.

22. An oxygen absorbing container comprising an oxygen absorbing layer comprising the oxygen absorbing resin of claim 1.

23. The oxygen absorbing container of claim 22, wherein the container comprises an oxygen-barrier layer on the outside of the oxygen absorbing layer.

* * * * *